(12) United States Patent
Thiel et al.

(10) Patent No.: US 11,124,151 B2
(45) Date of Patent: Sep. 21, 2021

(54) VEHICLE SEAT BELT ASSEMBLY HAVING LOFTED LATCH PLATE STOP

(71) Applicant: Ford Global Technologies, LLC, Dearborn, MI (US)

(72) Inventors: Brian Matthew Thiel, Beverly Hills, MI (US); Daniel Vincent Vega, Belleville, MI (US); Zachery Harold Nelson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 16/573,005

(22) Filed: Sep. 17, 2019

(65) Prior Publication Data

US 2021/0078524 A1   Mar. 18, 2021

(51) Int. Cl.
*B60R 22/20* (2006.01)
*B60R 22/12* (2006.01)
*B60R 22/18* (2006.01)

(52) U.S. Cl.
CPC ...... *B60R 22/12* (2013.01); *B60R 2022/1806* (2013.01)

(58) Field of Classification Search
CPC ....... B60R 22/18; B60R 22/30; B60R 22/023; B60R 2022/1812; B60R 2022/021; A44B 11/16; A44B 11/14; A44B 11/10; A44B 11/2557; A44B 11/2561
USPC ........................................................ 280/808
See application file for complete search history.

(56) References Cited

U.S. PATENT DOCUMENTS

| | | | |
|---|---|---|---|
| 5,254,065 A | 10/1993 | Pollock | |
| 5,571,064 A | 11/1996 | Holm | |
| 2013/0318753 A1* | 12/2013 | Nakai | A44B 11/2561 24/593.1 |
| 2016/0214565 A1* | 7/2016 | Bell | B60R 22/26 |
| 2019/0208869 A1 | 7/2019 | Lee et al. | |
| 2020/0079316 A1* | 3/2020 | Nassoiy | B60R 22/02 |
| 2020/0086822 A1* | 3/2020 | Nassoiy | B60R 22/02 |

* cited by examiner

*Primary Examiner* — Toan C To
(74) *Attorney, Agent, or Firm* — David Coppiellie; Price Heneveld LLP

(57) ABSTRACT

A seat belt assembly is provided that includes a buckle, a latch plate configured to releasibly latch onto the buckle, the latch plate comprising a body and a slot formed in the body, a seat belt webbing extending through the slot, and a latch plate stop feature connected to the seat belt webbing and comprising a lofted portion for preventing movement of the latch plate beyond a stop position.

16 Claims, 2 Drawing Sheets

VEHICLE SEAT BELT ASSEMBLY HAVING LOFTED LATCH PLATE STOP

FIELD OF THE INVENTION

The present invention generally relates to vehicle seat belts, and more particularly relates to a seat belt assembly having a latch plate that slides on a seat belt webbing and is supported in a stop position.

BACKGROUND OF THE INVENTION

Motor vehicles are commonly equipped with seats having seat belts. Conventional seat belts typically include a belt forming a lap belt and a shoulder belt that is connected onto a seat belt latch plate which, in turn, releasibly connects to a fixed buckle. The seat belt is generally made of a seat belt webbing and the latch plate may slide on the webbing to allow for repositioning between use and non-use positions. In the non-use position, the latch plate may rest on a fixed stop on the webbing to prevent downward movement beyond a stop position. However, in some vehicles the latch plate may rattle or make undesirable noise when driving off-road or in other harsh driving conditions. It would be desirable to provide a seat belt assembly that positions the latch plate on the seat belt webbing in a manner that is less susceptible to noise.

SUMMARY OF THE INVENTION

According to one aspect of the present invention, a seat belt assembly is provided. The seat belt assembly includes a buckle, a latch plate configured to releasibly latch onto the buckle, the latch plate comprising a body and a slot formed in the body, a seat belt webbing extending through the slot, and a latch plate stop feature connected to the seat belt webbing for limiting movement of the latch plate at a stop position, the latch plate stop feature comprising a loop of material having at least one inward folded portion forming a lofted portion.

Embodiments of the first aspect of the invention can include any one or a combination of the following features:
 the lofted portion of the latch plate stop comprises the loop formed of a seat belt webbing material and connected at the inward folded portion to create at least two curved portions;
 stitching for connecting overlapping layers of the inward folded portion;
 the lofted portion is substantially heart-shaped;
 the seat belt comprises a shoulder belt and a lap belt;
 the latch plate is configured to latch onto the buckle on a vehicle;
 the latch plate is held by the lofted portion of the latch plate stop feature at a stop position when the seat belt is unlatched;
 the lofted portion comprises a separate webbing connected to the seat belt webbing;
 the separate webbing is stitched onto the seat belt webbing; and
 the separate webbing is a seat belt webbing material.

According to another aspect of the present invention, a vehicle seat belt assembly is provided. The vehicle seat belt assembly includes a buckle, a latch plate configured to releasibly latch onto the buckle, the latch plate comprising a body and a slot formed in the body, a seat belt webbing extending through the slot and a latch plate stop feature connected to the seat belt webbing for limiting movement of the latch plate at a stop positon, the latch plate stop feature comprising a loop of material having at least one inward folded portion forming a lofted portion in the shape of a heart.

Embodiments of the second aspect of the invention can include any one or a combination of the following features:
 the lofted portion comprises a loop formed in the seat belt webbing and connected at overlapping layers of the inward folded portion;
 stitching provided in the latch plate stop for connecting the overlapping layers of the inward folded portion;
 the seat belt comprises a shoulder belt and a lap belt;
 the latch plate is configured to latch onto the buckle on a vehicle;
 the latch plate is held by the lofted portion when the seat belt is unlatched;
 the lofted portion comprises a separate webbing connected to the seat belt webbing; and
 the separate webbing is stitched onto the seat belt webbing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
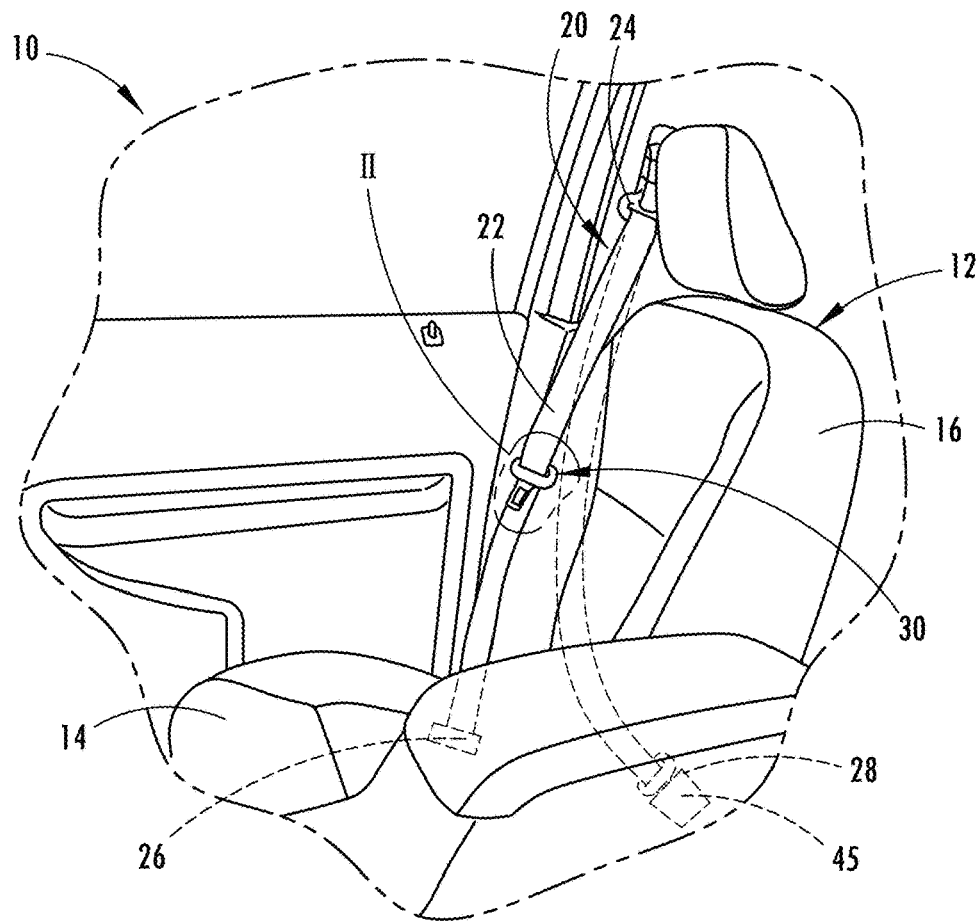
FIG. 1 is a perspective view of a passenger cabin of an automotive vehicle having a seat belt assembly for restraining a passenger and configured with a seat belt latch plate, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a restraint monitoring system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIG. 1, a portion of the passenger cabin or compartment of a vehicle 10 is generally illustrated having a seat belt assembly 20 assembled onto a seat assembly 12 and including a seat belt connector latch plate 30 engaged on a seat belt webbing 22, according to one embodiment. The vehicle 10 may include a wheeled motor vehicle, such as a car, truck, van or any other type of vehicle that includes a seating arrangement with one or more seat belt assemblies. The seat assembly 12 is generally illustrated including a lower seat 14 pivotally connected to an upper seat back 16 and configured to receive and retain a seated passenger. It should be appreciated that the vehicle 10 may include a plurality of seat assemblies 12 each equipped with a seat belt assembly 20 having a seat belt latch plate 30 slidingly engaged on the seat belt webbing 22 and configured to engage a latch plate stop feature 40 as shown and described herein.

The seat belt assembly 20 is shown as a three-point seat belt configuration having the seat belt webbing 22 connected at a first connection point 24 generally near the top of the seat back 16 or another supporting portion within the vehicle 10 such as the B-pillar, a second connection point 26 connected to the floor or the lower seat 14 of the vehicle 10 generally in the region of the lap of a passenger (not shown) seated on the lower seat 14, and a third connection point 28 shown at a seat belt buckle 45 which releasibly connects with the latch plate 30. The connector latch plate 30 is configured to be matingly and releasibly coupled to the seat belt buckle 45 for fastening the latch plate 30 onto the buckle 45 in a use position. The seat belt assembly 20 includes the seat belt comprising the seat belt webbing 22. The seat belt webbing 22 may be a fabric strap and may be flat according to one embodiment, or may be generally in the shape of a flattened tube defining an interior passageway which may form a seat belt airbag according to another embodiment.

In the embodiment shown, the seat belt webbing 22 serves to form a shoulder belt that is generally positioned to extend from the latch plate 30 over the shoulder and chest of a seated passenger and a lap belt which is positioned to extend over the lap of the seated passenger when seated in the seat assembly 12. The lap belt and shoulder belt are therefore integrally formed of the same continuous piece of seat belt webbing 22 as shown. It should be appreciated that in the seat belt use position, where the latch plate 30 is connected to the buckle 45, the latch plate 30 divides the shoulder belt and the lap belt. The seat belt webbing 22 may include a conventional webbing material that forms a seat belt. The seat belt webbing 22 may extend within one or more seat belt retractors such as retractors located at or near one or both of the first connection point 24 and second connection point 26 to rewind or retract the seat belt webbing 22 towards the non-use position.

The seat belt webbing 22 is slidably coupled to the latch plate 30 such that the latch plate 30 may slide and thereby change positions on the seat belt webbing 22. The sliding movement and coupling is made by way of a slot 38 extending through the latch plate 30 which enables the seat belt webbing 22 to pass through the slot 38 in the seat belt latch plate 30. The seat belt webbing 22 is configured with a latch plate stop feature 40 that holds the latch plate 30 in a stop position on the seat belt webbing 22 sufficient to prevent the latch plate 30 from sliding in one direction (e.g., downward) below the stop position on the seat belt webbing 22. As such, when the seat belt assembly 20 is in the non-use or stowed position with the seat belt webbing 22 retracted, the latch plate 30 will abut the latch plate stop feature 40 on the seat belt webbing 22. As such, the seat belt latch plate 30 is prevented from dropping downward due to gravity or other force beyond the latch plate stop feature 40 towards the ground, and the latch plate 30 is thereby maintained in the elevated stop position on the seat belt webbing 22. Typically the elevated stop position presents the latch plate 30 at an easy to reach position for a seated passenger to grasp the latch plate 30, pull on the latch plate 30 to unwind the seat belt webbing 22, and latch the latch plate 30 onto the buckle 45 in the use position. When a seated passenger uses the seat belt assembly 20 to connect the latch plate 30 onto the buckle 45, the seat belt latch plate 30 slides along the seat belt webbing 22 due to force applied by the user on the latch plate 30 to enable the latch plate 30 to be positioned to be connected (i.e., latched) onto the buckle 45. When the seat belt assembly 20 is removed from a seated passenger, the seat belt webbing 22 retracts and the latch plate 30 slides along the seat belt webbing 22 to the non-use or stowed position.

Figure 2:
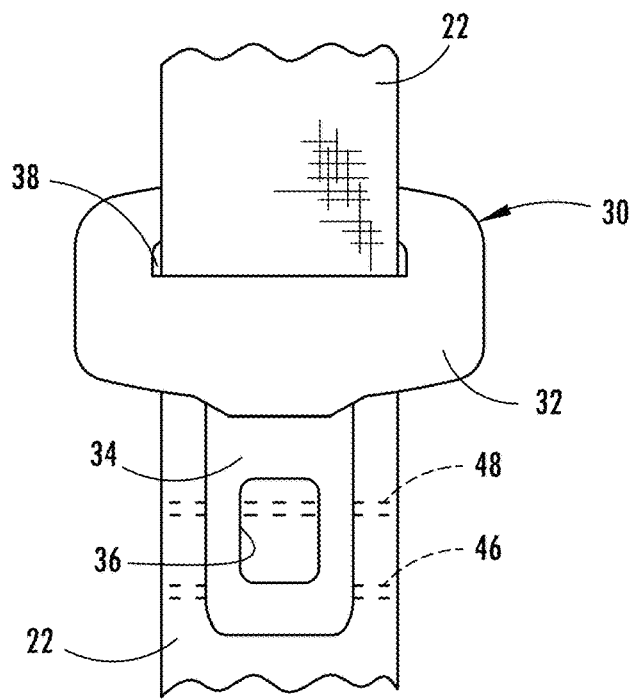
FIG. 2 is an enlarged view of section II of FIG. 1 further illustrating the seat belt latch plate, according to one embodiment.

Referring to FIG. 2, the seat belt latch plate 30 is further illustrated having a metal tongue 34 that forms a latching mechanism and has a latch receiving opening 36 to enable engagement with a latch on the buckle 45. The metal tongue 34 has a shape and size positioned to be received within a latch opening in the buckle 45 and latched thereto in the seat belt use position. The latch plate 30 further includes a body shown as an upper body 32 which connects to and supports the metal tongue 34. The upper body 32 may include a plastic coating that is overmolded onto the metal tongue 34. The seat belt slot 38 extends through the upper body 32 to enable the seat belt webbing 22 to extend therethrough. The seat belt slot 38 has a width and depth greater than the width and depth of the seat belt webbing 22 sufficient to allow the seat belt webbing 22 to slide in the seat belt slot 38 and prevent the latch plate stop feature 40 from passing through the seat belt slot 38.

Figure 3:
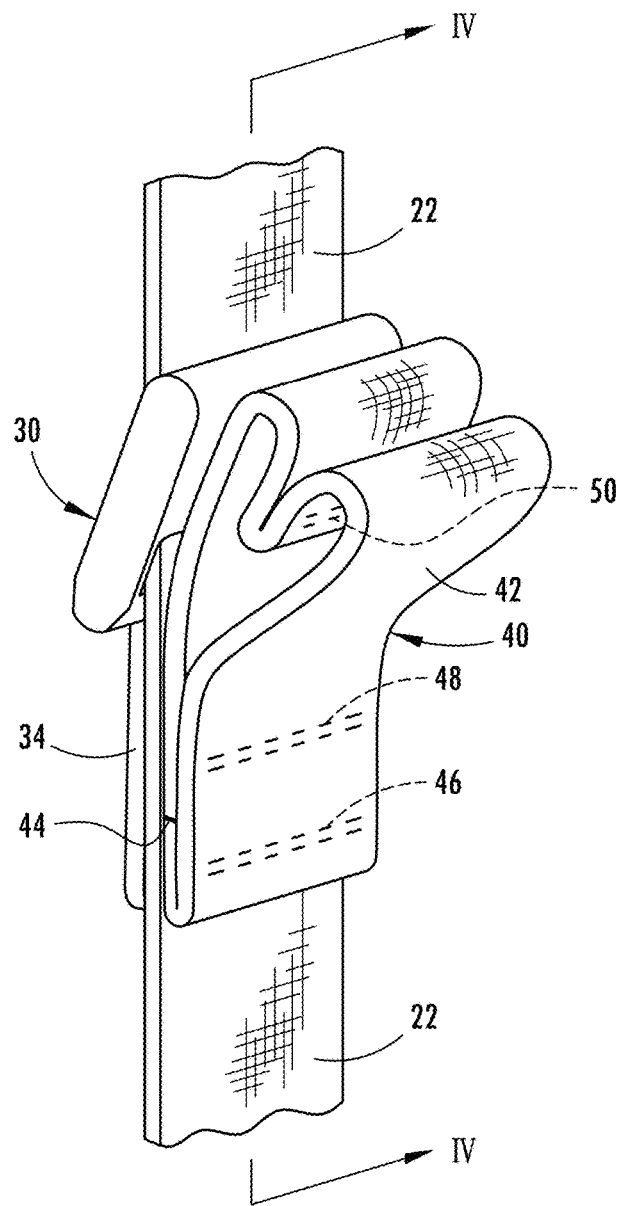
FIG. 3 is an enlarged perspective view of the latch plate engaging a latch plate stop, according to one embodiment.
Figure 4:
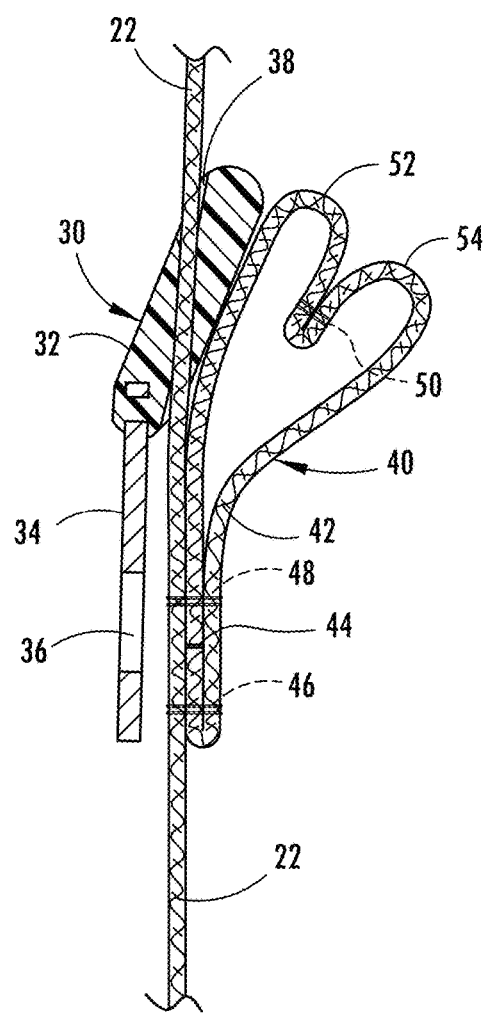
FIG. 4 is a cross-sectional view taken through line IV-IV of FIG. 3 further illustrating the latch plate and latch plate stop.

Referring to FIGS. 3 and 4, the seat belt assembly 20 is shown having a lofted latch plate stop feature 40 connected to the seat belt webbing 22. The latch plate stop feature 40 provides a barrier that limits movement of the latch plate 30 at a stop position on the seat belt webbing 22. The lofted latch plate stop feature 40 includes a loop of bendable material 42 having at least one inward extending portion forming a lofted portion for catching the latch plate 30 as it slides on the seat belt webbing 22 via slot 38 to limit movement of the latch plate 30 relative to the seat belt webbing 22 at the stop position. The inward extending portion is folded on itself approximately 180 and sewn together with stitching 50 to create at least two curved portions 52 and 54 that cause the loop of bendable material to loft outwards away from one another in the shape of a heart. The lofted latch plate stop feature 40 is positioned on one side of the seat belt webbing 22 opposite the metal tongue 34. When the latch plate 30 is in the stowed non-use position, the latch plate 30 may move relative to the seat belt 22 downward due to gravity or other force until it reaches the stop position defined by the lofted latch plate stop feature 40. The lofted portion of the lofted latch plate stop feature 40 engages the upper housing 32 of the latch plate 30 which prevents the stop feature 40 from passing through the seat belt slot 38, thereby stopping downward movement of the latch plate 30 beyond the stop position.

The lofted latch plate stop feature 40 is shown made up of a loop of bendable material 42 such as a piece of the same or similar seat belt webbing material used for the seat belt and is generally shown arranged in a closed loop. The piece of material 42 has ends 44 that are aligned with one another and the material 42 is essentially overlapped and stitched onto the seat belt webbing 22 at stitching locations 46 and 48 near the lower end of the loop of material 42. The ends 44 of the material 42 are positioned between the first and second stitching portions 46 and 48. As such, the material 42 is fixedly connected onto the seat belt webbing 22 at a lower end such that the lofted portion is at the upper end. At the upper end of the loop of material 42, the piece of material 42 is folded inward and onto itself to form the double curved portions 52 and 54 pattern and the overlapping portions are stitched together at stitching 50 so as to form a lofted configuration having a generally heart-shape. The lofted portion of the lofted latch plate stop feature 40 essentially creates a widened and resilient stop feature that may abut the body 32 of the latch plate 30 to dampen vibrations and prevent or reduce unwanted noise due to the vibration while driving the vehicle 10, particularly on rough terrain.

The stitching 50 may include any known stitching for stitching two layers of bendable material together. Alternatively, the lofted portion of the latch plate stop 40 may be formed by otherwise connecting portions of the loop together such as by using adhesive or fasteners such as staples or rivets, according to other embodiments. It should be appreciated that the lofted portion at the upper end of the latch plate stop feature 40 may include additional inward folded and curved portions such as three or four or more curved portions to provide additional loft or width with further stitching or other connections. It should be appreciated that the shape of a heart-shape provided by the lofted portion advantageously provides resiliency so as to apply a cushion force onto the body 32 of latch plate 30 to thereby dampen and reduce or minimize noise due to vibration.

The lofted latch plate stop feature 40 may be formed and assembled to the seat belt webbing 22 at a location of the stop position for the latch plate 30 such as to provide a convenient height to hold the latch plate 30 in the non-use position that is easy for a seated passenger to locate when using the seat belt. The stop position may be any desired location.

The latch plate stop feature 40 may be formed and assembled to the seat belt webbing 22 as follows. A predetermined cut length of seat belt webbing or other bendable material may be folded over to provide a flat fold. A straight stitch 50 may be sewn across near the top edge of the fold, through the entire width of the material. The webbing fold may then be reversed, forming a heart-shaped loop with curved portions 52 and 54. The opposite end with remainder of the stop feature 40 is then folded and sewn to the seat belt webbing 22 with stitching 46 and 48. It should be appreciated that the latch plate stop feature 40 may be formed in other shapes and sizes according to other methods.

Accordingly, the seat belt assembly 20 as described herein advantageously provides for an enhanced latch plate stop feature 40 for stopping movement of the latch plate 30 in a stop position in a manner that dampens and minimizes or reduces vibratory movement and noise that may occur due to vibration of the vehicle 10 such as while the vehicle 10 is driven off-road or on a rough road.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat belt assembly comprising:
a buckle;
a latch plate configured to releasibly latch onto the buckle, the latch plate comprising a body and a slot formed in the body;
a seat belt webbing extending through the slot;
a latch plate stop feature connected to the seat belt webbing for limiting movement of the latch plate at a stop position, the latch plate stop feature comprising a loop of material having at least one inward folded portion forming a lofted portion, wherein the lofted portion of the latch plate stop comprises the loop formed of a seat belt webbing material and connected at the inward folded portion to create at least two curved portions; and
stitching for connecting overlapping layers of the inward folded portion.

2. The seat belt assembly of claim 1, wherein the seat belt comprises a shoulder belt and a lap belt.

3. The seat belt assembly of claim 1, wherein the latch plate is configured to latch onto the buckle on a vehicle.

4. The seat belt assembly of claim 1, wherein the latch plate is held by the lofted portion of the latch plate stop feature at a stop position when the seat belt is unlatched.

5. The seat belt assembly of claim 1, wherein the lofted portion comprises a separate webbing connected to the seat belt webbing.

6. The seat belt assembly of claim 5, wherein the separate webbing is stitched onto the seat belt webbing.

7. The seat belt assembly of claim 6, wherein the separate webbing is a seat belt webbing material.

8. A seat belt assembly comprising:
a buckle;
a latch plate configured to releasibly latch onto the buckle, the latch plate comprising a body and a slot formed in the body;
a seat belt webbing extending through the slot; and
a latch plate stop feature connected to the seat belt webbing for limiting movement of the latch plate at a stop position, the latch plate stop feature comprising a loop of material having at least one inward folded portion forming a lofted portion, wherein the lofted portion is substantially heart-shaped.

9. A vehicle seat belt assembly comprising:
a buckle;
a latch plate configured to releasibly latch onto the buckle, the latch plate comprising a body and a slot formed in the body;
a seat belt webbing extending through the slot; and
a latch plate stop feature connected to the seat belt webbing for limiting movement of the latch plate at a stop positon, the latch plate stop feature comprising a loop of material having at least one inward folded portion forming a lofted portion in a shape of a heart.

10. The vehicle seat belt assembly of claim 9, wherein the lofted portion comprises a loop formed in the seat belt webbing and connected at overlapping layers of the inward folded portion.

11. The vehicle seat belt assembly of claim 10 further comprising stitching provided in the latch plate stop for connecting the overlapping layers of the inward folded portion.

12. The vehicle seat belt assembly of claim 9, wherein the seat belt comprises a shoulder belt and a lap belt.

13. The vehicle seat belt assembly of claim 9, wherein the latch plate is configured to latch onto the buckle on a vehicle.

14. The vehicle seat belt assembly of claim 9, wherein the latch plate is held by the lofted portion when the seat belt is unlatched.

15. The vehicle seat belt assembly of claim 9, wherein the lofted portion comprises a separate webbing connected to the seat belt webbing.

16. The vehicle seat belt assembly of claim 15, wherein the separate webbing is stitched onto the seat belt webbing.

* * * * *